Jan. 19, 1971 C. E. BENDER ETAL 3,556,760
APPARATUS FOR HEAT SEALING EVACUATED GLASS AMPULES
Filed June 28, 1968 2 Sheets-Sheet 1
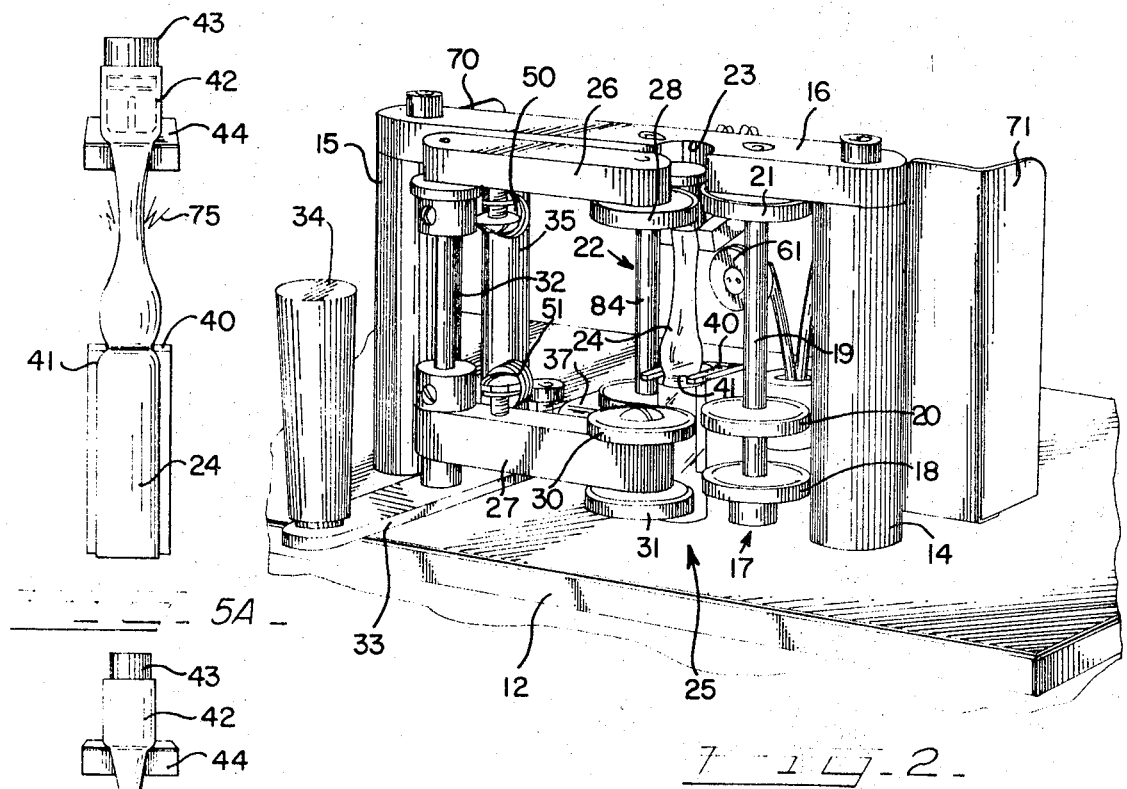
FIG. 2
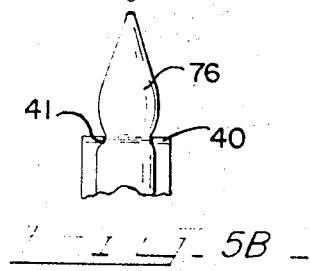
FIG. 5A
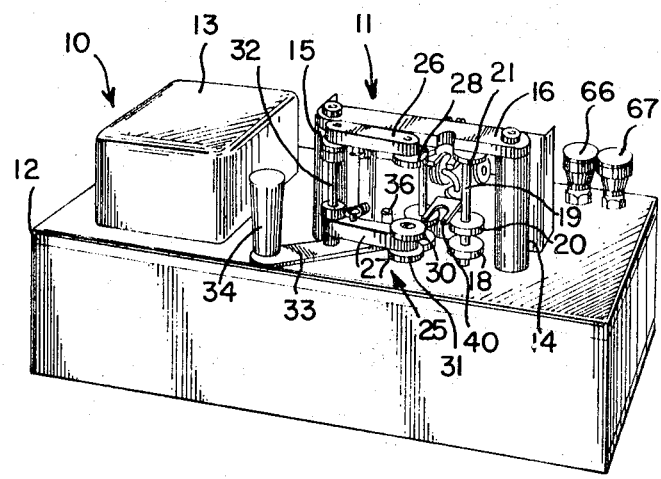
FIG. 1
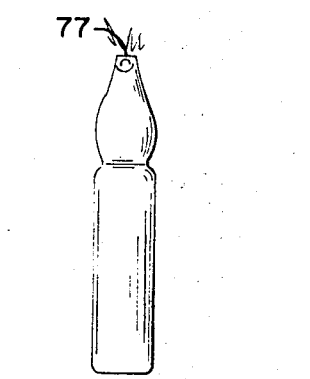
FIG. 5B
FIG. 5C
INVENTORS
DOUGLAS S. FRASER
CHARLES E. BENDER
TAYLOR N. THOMPSON
BY Robert E. Wagner ATT'Y.

INVENTORS
DOUGLAS S. FRASER
CHARLES E. BENDER
TAYLOR N. THOMPSON
BY Robert E. Wagner ATT'Y.

United States Patent Office 3,556,760
Patented Jan. 19, 1971

3,556,760
APPARATUS FOR HEAT SEALING EVACUATED GLASS AMPULES
Charles E. Bender, Taylor Norris Thompson, and Douglas S. Fraser, New Paltz, N.Y., assignors to The Virtis Company, Inc., Gardiner, N.Y., a corporation of New York
Filed June 28, 1968, Ser. No. 741,084
Int. Cl. C03b 23/12
U.S. Cl. 65—268          8 Claims

ABSTRACT OF THE DISCLOSURE

An apparatus for automatically heat sealing ampules which has means to rotate the ampule about an axis, means to heat the ampule for a timed period, and means for continuously applying oppositely directed forces on said ampule along the axis without torsional restraint. The forces are applied while the ampule is rotated and heated, to cause axial separation of the ampule while maintaining the ampule in evacuated condition. There is a second heating means for annealing the ampule in the region of separation.

---

This invention relates to an apparatus for heat sealing ampules and a method for sequentially performing the operation to provide a finished product or heat sealed ampule which will have good strength characteristics.

Broadly speaking, heat sealing of glass ampules containing freeze dried serum, tissue samples, virus and similar types of biological specimens in and of themselves are not new. Machines and hand torches for heat sealing glass ampules are presently available. Because of the effort and skill required in using known devices, it is a tedious job to heat seal ampules if any sizable quantity is involved.

As known in the art, glass ampules are formed with a lower portion which receives the specimen and an upper portion which has an open mouth to receive a rubber stopper after freeze drying or evacuating has been completed. An elongated neck having a reduced diameter is located below the mouth and is heated, permitting the wall to collapse radially under atmospheric pressure. The upper part of the ampule is pulled away, leaving the specimen in the bottom portion of the ampule enveloped in glass. This time-honored technique has been continued over the years because of the extremely high resistance of glass to air permeation even though stored over prolonged periods of time at considerable differentials in pressure. As pointed out above, problems are encountered when several thousand ampules are to be heat sealed with known types of equipment. Extreme care must be exercised when heating the ampule to cause separation after it has been evacuated if the complete collapse of the wall is to be avoided with its consequent loss of vacuum and spoiling of the specimen. It can be summarized that present day techniques are rather crude and leave something to be desired when large numbers of ampules are to be sealed.

The present heat sealing apparatus, while of relatively simple design, is quite sophisticated operationally. A novel means is provided to uniformly heat the ampules during separation and simultaneously apply a light controlled axial force to assist in separating the top and bottom of the ampule. The resulting heat sealed bottom portion is left in the region of separation with a flame-shaped tip which, under ordinary handling, is quite fragile and because of its location is susceptible to breakage with loss of vacuum and attendant adverse consequences. A novel annealing means is provided automatically to re-heat the tip after a timed cooling period to relieve any stresses resulting from separation and also permit the axial and radial collapse of the tip. A region of increased wall thickness is formed which has greater mechanical strength. This permits the heat sealed ampule to be routinely handled with less likelihood of breakage.

The novel method of heat sealing may be summarized as including rotating the ampule while simultaneously heating it in the region to be separated. Throughout the heating and rotating step, a light axial pressure is applied until separation occurs, forming top and bottom portions of the ampule. The bottom portion of the ampule is cooled in the area of separation and then subsequently reheated to anneal the lower or bottom portion of the ampule containing the specimen in the region of separation and simultaneously reform this region.

The means to accomplish the above method consists of an appartus which includes first and second rollers adapted to engage the ampule at the top and bottom portions thereof. A third roller is mounted on a movable arm for controlled movement into engagement with the top and bottom portions of the ampule. In this manner, the ampule is vertically located between three sets of rollers which engage it at top and bottom to confine it during rotation. One of the sets of rollers is driven at a substantially uniform rate and through the silicon rubber drive portion carried on the outer circumference of the roller, imparts rotational motion to the ampule. The remaining two sets of rollers act as idlers or guides to confine the ampule during rotation. The heating means includes an automatic indexing means which, after initiation of rotation, indexes a burner into position to direct a flame on the ampule in the separating region. Heat is applied for a period of predetermined duration. When the ampule is initially inserted between the rollers, means is provided to apply a light axial force to opposite ends above and below the separating region where the flame of the burner is played on the ampule. As the heating occurs, the atmospheric pressure acting on the outer walls of the ampule, together with the light axial force, causes separation, leaving the bottom of the ampule sealed. The region of separation assumes a generally flame-shaped configuration. The burner head is then indexed to a position to permit cooling for a predtermined period. After the cooling period has elapsed, a second burner, which is located at a lower elevation than the first, is automatically indexed into position to direct its flame on the flame-shaped part of the bottom or specimen containing portion of the ampule. This results in the flame-shaped portion being annealed and heated to a point where atmospheric pressure forces the pointed tip generally down into the neck, resulting in the formation of a blunt tip of increased thickness having good strength which is less susceptible to breakage.

Mechanically speaking, the apparatus of the present invention is of relatively simple construction which enhances its reliability, however, this simplicity does not detract from its sophisticated operation. Because of the timed relation of the heating sequence and light axial pressure, the danger of overheating of the speciment is eliminated. Also avoided is the danger of a complete collapse of the glass walls due to overheating. The present apparatus permits heating sealing to be accomplished even though glass ampules of this type are traditionally not geometrically symmetric. Other advantages will become apparent upon consideration of the objects and description.

It is an object of this invention to provide a new and improved apparatus for heat sealing amples and the like.

It is a further object of this invention to provide a new and improved method of heat sealing ampules to form a sealed ampule having good strength.

It is a still further object of this invention to provide an apparatus for heat sealing ampules having means automatically to time the heating of the ampule while applying a light axial force.

It is a further object of this invention to provide a novel means to anneal the specimen containing a portion of the ampule after separation and heat sealing to reform the separated portion and thereby enhance its strength.

It is a still further object of this invention to provide a new and improved apparatus for heat sealing ampules and the like, which apparatus is of uncomplicated design and is easily operated by people having no special skills.

Objects other than those stated will become apparent when consideration is given to the accompanying drawings and following description.

In the drawings:

FIG. 1 is a perspective view of the heat sealing apparatus of the present invention;

FIG. 2 is an enlarged fragmentary view of the ampule holder assembly of the apparatus shown in FIG. 1;

FIGS. 5A, 5B and 5C are schematic elevational views of the ampule shown in FIG. 2, generally illustrating the sequence of changes undergone in a glass ampule after heat sealing and annealing by the apparatus shown in FIGS. 1–4.

Figure 3:
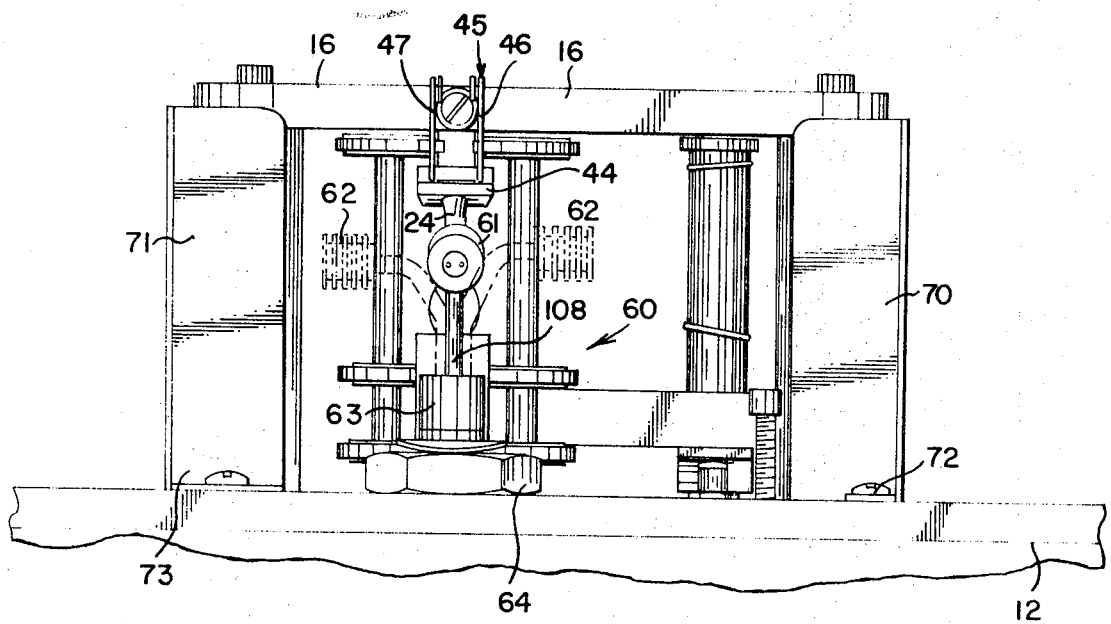
FIG. 3 is a rear elevational view of the ampule holder assembly shown in FIG. 2.

Referring now to FIG. 1 reference numeral 10 generally indicates the heat sealing apparatus of the present invention, being illustrated with the ampule holder portion indicated generally at 11, the latter being conditioned to receive an ampule to be heat sealed. The ampule receiving portion consists of a pair of supports 14 and 15, supporting a transverse member 16 in parallel spaced relation to a base 12 and which serves as a bearing plate. A first roller assembly, indicated generally at 17, has one end mounted for rotation on the base 12 with the opposite end journalled in the bearing plate 16.

The roller assembly 17 includes lower rollers 18 and 20 and an upper roller 21 which is disposed adjacent the bearing plate 16, all being mounted for rotation on a common shaft 19. A second roller assembly of identical construction is indicated generally by reference numeral 22 and is located parallel to the first roller assembly 17 and in generally parallel relation thereto. The rollers on the assemblies 17 and 22 are spaced a suitable distance on opposite sides of a slot 23 formed in the bearing plate and which is sized so as to loosely receive an ampule shown at 24 (FIG. 2).

A third roller assembly is indicated generally by reference numeral 25 and consists of a pair of idler arms 26 and 27 mounted for swinging movement on a shaft 32. The upper idler arm 26 supports a single roller 28 while the lower idler arm supports spaced rollers 30 and 31. Suitable spring means 50 and 51 are attached to the posts 35 and have opposite ends attached to the idler arms 26 and 27, respectively, to bias the arms in a direction to maintain the rollers 28, 30 and 31 in engagement with the ampule when the handle 34 is moved to the closed position. The shaft 32 is supported on a pivoting arm 33 having the operating handle 34 on one end. The opposite end extends beyond a supporting shaft 35 which extends between the bearing plate 16 and base 12. On movement of the handle 34 to the closed position, the opposite end of the arm engages a switch actuator 36 which energizes the motor to commence the operation of the heat sealer as will be described in greater detail hereinafter.

As shown in FIG. 2, when the handle 34 is moved to the closed position, the upper roller 28 and lower rollers 30 and 31 on the arms 26 and 27, respectively, cooperate with the roller assemblies 17 and 22 to confine the ampule 24. A generally U-shaped bracket 40 projects laterally of its support at an elevation so as to receive a necked-in portion 41 of the ampule 24 and hold it against axial movement. An enlarged portion 42 of the ampule 24 adjacent the mouth receives a stopper 43 and is nested in an ampule support 44 of generally U-shaped configuration. As best seen in FIG. 3, the ampule support 44 is mounted below the bearing plate 16 by means of a spring member 45 having spring arms 46 and 47 which enter the ampule support 44 on opposite sides of the generally U-shaped slot which receives the upper portion of the ampule 42. The spring operates to urge the ampule support 44 upward to provide an axial force at the top of the ampule while permitting free rotation for uniform heating.

Figure 4:
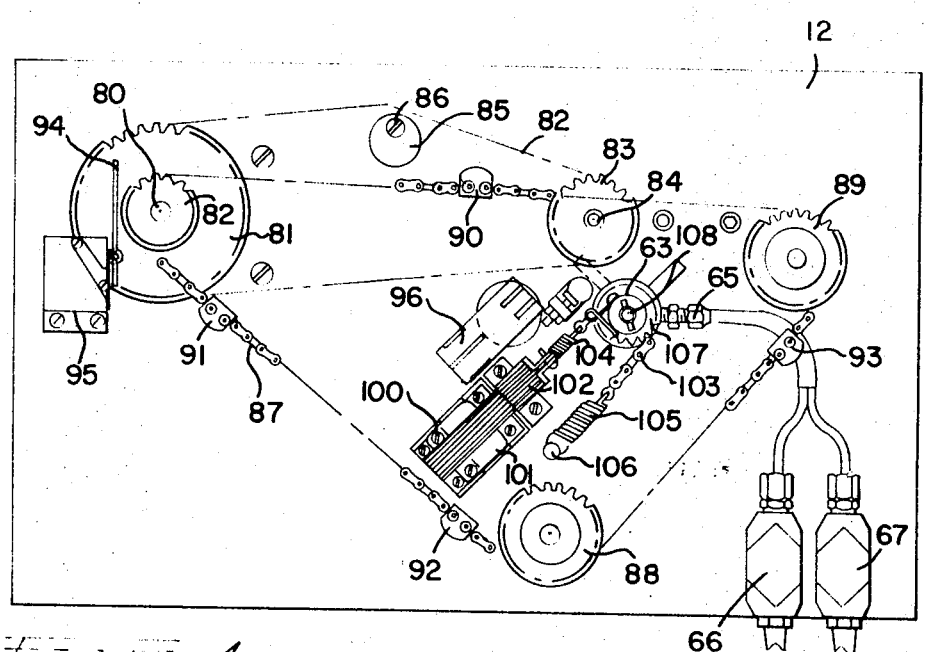
FIG. 4 is a bottom plan view of the drive assembly for the heat sealing apparatus.

As seen in FIG. 3, a burner assembly, indicated generally by the reference numeral 60, consists of oppositely directed burners 61 and 62. In the condition shown, the burner 61 serves as the separating burner, while the oppositely directed burned 62 serves as the annealing burner. Both burners are mounted on a single burner or torch support 63 which is rotatable, but held against axial movement relative to the base 12 by a nut 64. As seen in FIG. 4, the torch support 63 is provided with a gas and oxygen inlet line 65 which enters the support radially and communicates with the burners 61 and 62 in a well known manner. Suitable oxygen and gas controls in the form of valves are shown at 66 and 67, respectively, in FIGS. 1 and 4. These may be of the micrometer type to permit selection and reselection of the most suitable proper gas-oxygen mixture for optimum heating value. As seen in FIGS. 1–3, flame shields 70 and 71 are carried at opposite ends of the ampule holder assembly 11 on the rearward side, being attached to the base through sheet metal screws 72 and 73, respectively, and serve to protect the operator from the flame when changing ampules.

In the condition shown in FIGS. 2 and 3, the burner heads are in the position assumed when separating the ampule 24. After separation is completed, they are indexed 90° to a neutral or non-heating position to permit slight cooling. Subsequently, the annealing burner 62 is rotated 90° into position to anneal the lower or separated portion of the ampule. After annealing, the burners are indexed an additional 90° to the position shown in dotted lines in FIG. 3 to permit the operator to remove the separated, sealed and annealed ampule.

Before detailed description of the mechanism which performs the sequence above described is given, reference is made to the schematic views of FIGS. 5A, 5B and 5C which generally illustrate the sequential steps of heat sealing and annealing the ampule. In FIG. 5A, the holder 40 lightly engages the necked-in portion 41 in the ampule 24 while the lower portion of the ampule is resting on the base 12. The upper portion 42 is engaged by the upper ampule support 44 which provides a light axial force generally parallel to the geometric axis of the ampule 24. Heat in the form of a flame shown fragmentarily at 75 is applied to the separating region of the ampule while the ampule 24 is being rotated at a uniform rate. The combined effect of atmospheric pressure acting on the outer walls of the ampule and the light axial force causes the upper and lower portions to separate while maintaining the vacuum which was imposed during freeze drying. The resulting configuration is a generally flame-shaped tip 76 which, if left unchanged, is fairly fragile and susceptible to breakage. The flame-shaped tip is allowed to cool for a predetermined time and then subsequently is reheated by a flame which is applied slightly below the elevation of the flame that was applied in separation. If heating was continued after separation, a danger exists that the glass would soften to a point where the glass wall of the ampule 24 would collapse with a resulting loss in vacuum. The reheating after slight cooling results in the softening of the glass sufficiently to permit slight deformation without collapse. Atmospheric pressure acting on the softened flame-shaped tip causes it to assume an inverse or dimple configuration such as that shown at 77 in FIG. 5C. The ampule is now heat sealed, annealed and prepared for storage with a relatively blunt end.

Referring now to FIG. 4, the drive assembly for the heat sealing apparatus will be described. The motor drive shaft 80 supports a large sprocket 81 and a smaller sprocket 82 for rotation at a speed of about 25 r.p.m. This may be varied, depending upon the requirements and variables. The large sprocket 81 is supported on the lower end of the shaft 80 and, through a chain-type belt 82, drives a smaller sprocket 83 on a shaft 84 which forms a part of the roller assembly 22. The tension on the chain belt 82 may be adjusted by a cam tightener 85 which is attached to the underside of the base 12 by means of a screw 86. The smaller sprocket 82 on shaft 80 also drives an endless chain belt 87 which is supported around idler sprockets 88 and 89. The idler sprockets are designed to permit a chain to be used which has a fixed length, which length is chosen in relation to the speed of the drive. Timing cams 90, 91, 92 and 93 are supported at spaced intervals on the chain by means of set screws (not shown) which serve to clamp the timing cams to the chain drive. The timing cams are located so as to engage the arm 94 of a microswitch 95 which operates to time the sequence of the operation as will be seen. The microswitch 95 is hooked in a circuit containing switch 96 which, as previously pointed out, has the actuator 36 disposed above the base 12 in a location for engagement by the arm 33 which supports the operating handle 34.

A solenoid 100 is mounted on the underside of the base 12 and consists of the usual field 101 and moving core 102. One end of the movable core 102 is connected through a spring 104 to a chain 103 having its opposite end connected to a post 106 fixed to the base 112 through a spring 105. The chain 103 extends around a sprocket 107 which is keyed or joined to a hollow post 108 in communication with the burners 61 and 62. The sprocket 107 is joined to the shaft 108 by a conventional unidirectional ratchet (not shown) which operates to index or rotate the shaft 108 in a counterclockwise direction as viewed from the bottom plan view of FIG. 4 upon actuation of the solenoid.

Operation of the motor driving the motor shaft 80 is commenced by moving the handle 34 to the right, resulting in the inner end of the handle engaging the actuator 36 of the microswitch 96, causing the shaft 80 to rotate. As the first timing cam 90 engages actuator 94, the solenoid 100 is energized, causing the operator 102 to retract, indexing the shaft 108 a full 90° to bring the burner head 61 into the position shown in FIG. 3 so that the flame is directed on the separating region of the ampule 24. After the switch 95 is opened, the solenoid is de-energized and the spring 105 returns the solenoid core 102 to the position shown. Because of the unidirectional ratchet, the burner position is not effected. The status quo remains until the cam 93 engages the actuator 94, causing the solenoid to be energized once again. This causes the burners 61 and 62 to assume the condition shown in dotted lines in FIG. 3. The previous period has been of sufficient duration so that the ampule has been separated as shown in FIG. 5B. The motor continues to run and the timing cam 92 engages the switch actuator 94, once again energizing the solenoid 100. This causes the shaft 108 to be indexed an additional 90°, bringing the annealing burner 62 into a position whereby its flame will be directed on the lower half of the ampule at and slightly below the region of separation, causing annealing and reformation of the tip to the configuration shown in FIG. 5C. When the cam 91 engages the switch actuator, annealing and reformation is complete and the burners are indexed to the position shown in dotted lines in FIG. 3, the motor is de-energized, and the ampule may be removed. The stopper 43 may be reused while the separator portion is discharged, as the controlled heating prevents damage to it.

It is important to note that the timed sequence of heating, cooling and reheating to anneal and reform the glass ampule is such that litttle or no heat is transmitted to the specimen which is contained within the ampule. The apparatus is quickly set up for operation by adjusting the oxygen-gas mixture with the convenient micrometer valve controls. Thereafter, each ampule is merely inserted and the handle moved to the closed position to initiate heat sealing. The apparatus automatically heat seals and anneals the ampule, as well as shutting off the apparatus when completed.

Upon a consideration of the foregoing, it will become obvious to those skilled in the art that various modifications may be made without departing from the invention embodied herein. Therefore, only such limitations should be imposed as are indicated by the spirit and scope of the appended claims.

We claim:

1. An apparatus for use in heat sealing ampules and the like in ambient conditions, said apparatus comprising means to rotate said ampule about an axis, means to continuously apply oppositely directed forces on said ampule along said axis and heating means to heat said ampule while continuously rotating the same with said axial forces applied, said means to apply oppositely directed axial forces to said ampule includes a gripping means to engage a necked-in portion of said ampule while permitting free rotation thereof, and spring means to urge said gripping means in a generally axial direction to exert an axially directed force on said ampule to cause axial separation thereof when sufficient heating occurs, said ampule being sealed against the ambient.

2. The apparatus of claim 1 wherein said heating means includes means to heat said ampule at two different elevations to provide for heat separation and annealing, one of said elevations being chosen for separating top and bottom portions of said ampule and the other of said elevations being chosen to anneal the bottom portion after separation from said top portion.

3. The apparatus of claim 2 wherein said means to heat said ampule at two locations comprises a pair of burners, each of said burners emitting a flame and means to sequentially index said burners to heat and seal said bottom portion of said ampule in timed relation, while maintaining the evacuated condition of said ampule.

4. The apparatus of claim 1 wherein said means to continuously rotate said ampule includes first and second roller means, each of said roller means having rollers thereon for engagement with opposite ends of said ampule, a third roller means having rollers thereon for engagement with opposite ends of said ampule and means to rotate one of said roller means to impart rotation to said ampule while said heating means heats said ampule.

5. The apparatus of claim 4 wherein one of said roller means is supported on a movable arm, and switch means is disposed for actuation by said arm to initiate operation of one of said roller means and indexing of said means to heat said ampule.

6. The apparatus of claim 4 wherein said roller means includes a layer of silicon rubber around the periphery of each of said rollers, said rubber layer compensating for imperfections in the shape of the ampule.

7. An apparatus for use in heat sealing ampules and the like in ambient conditions, said apparatus comprising means to continuously rotate said ampule about an axis, means to continuously apply oppositely directed forces on said ampule along said axis without torsional restraint and first heating means to heat said ampule while continuously rotating the same with said axial forces applied, to separate a lower portion of said ampule while said lower portion remains sealed against the ambient and a second heating means for annealing said lower portion in the region of said heating means.

8. The apparatus of claim 7 wherein said means to apply oppositely directed axial forces to said ampule comprises a first gripping means for engagement with a first necked-in portion of said ampule, a second gripping means to engage a second necked-in portion of said ampule, said second necked-in portion being axially spaced from said first necked-in portion, and spring means to urge one of said gripping means in a generally axial direction away from the other of said gripping means, to provide an axially directed force on said ampule.

References Cited

UNITED STATES PATENTS

| | | | |
|---|---|---|---|
| 793,211 | 6/1905 | McDonnell | 65—104 |
| 2,689,677 | 9/1954 | Unger | 65—270X |
| 3,215,517 | 11/1965 | Zimmerman | 65—105X |
| 3,265,487 | 8/1966 | Kahlenberg | 65—105X |
| 3,437,471 | 4/1969 | Bott | 65—270 |

S. LEON BASHORE, Primary Examiner

S. R. FRIEDMAN, Assistant Examiner

U.S. Cl. X.R.

65—272, 283, 292